United States Patent Office 2,709,682
Patented May 31, 1955

2,709,682

LUBRICANT CONTAINING REACTION PRODUCTS OF CONJUGATED UNSATURATED KETONES WITH ORGANIC SULFHYDRYL COMPOUNDS

Edwin C. Knowles, Glenham, and Herman D. Kluge, Fishkill, N. Y., and Joseph E. Fields, Dayton, Ohio, assignors to The Texas Company, New York, N. Y., a corporation of Delaware No Drawing. Application September 22, 1950, Serial No. 186,304

19 Claims. (Cl. 252—48.2)

This invention relates to lubricating compositions containing a novel class of addition agents. More particularly it relates to mineral lubricating oil compositions containing the reaction products of aliphatic alpha-beta unsaturated ketones with organic sulfhydryl compounds. It is old in the art to employ addition agents for improving various properties of lubricating compositions, such as their resistance to oxidation, anti-corrosiveness, oiliness, film strength, viscosity index and so forth. Various types of sulfur-containing compounds have been found to be especially valuable as modifying agents in lubricants, particularly the organic sulfides, including mercaptans, mercaptols, mercaptals and other thio ethers. Such compounds when added to mineral oil lubricants impart increased load-bearing capacity, anticorrosiveness and other improvements in varying degrees depending upon the particular compound employed. For example, Adams et al., U. S. 2,110,281, disclose extreme pressure agents having the formula $RSR_1$, where R and $R_1$ are alkyl or aromatic groups. Brooks et al., U. S. 2,480,832, disclose thio ethers in which a sulfur atom is attached to a thienyl group and to an alkyl or aromatic group as oxidation inhibitors for lubricating compositions. It is also known in the art that aliphatic alpha-beta unsaturated ketones comprise a class of compounds having the property of forming addition agents with various reactants to form compounds which are desirable components of lubricants. For example, Gaynor, U. S. 2,477,244, discloses that alpha-beta conjugated unsaturated ketones may be added to lubricating oils to form addition compounds with the hydrogen sulfide present in the oil. Adelson, U. S. 2,489,249, discloses that lubricant additives may be prepared by reacting various organic compounds, including methyl oxide, phorone and isophorone, with hydrogen sulfide and treating the reaction products obtained with phosphorus and sulfur or with phosphorus sulfide.

We have now found that improved modifying agents for mineral oil lubricants are obtained by reacting organic sulfhydryl compounds with unsaturated ketones of the type disclosed in the above cited patents to form sulfur-containing reaction products.

By aliphatic alpha-beta unsaturated ketones is meant aliphatic unsaturated ketones in which at least one olefin group is directly connected with a ketonic carbonyl group. These conjugated unsaturated groups may be present in an open chain aliphatic compound or aliphatic group, or one or both the conjugated unsaturated groups may be contained in a cyclic alpihatic structure. Aromatic groups may also be present in the molecule, as well as other substituents such as halogen atoms, hydroxyl groups or amino groups if desired.

The following compounds are examples of suitable ketones for the reaction:

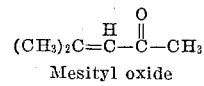
Mesityl oxide

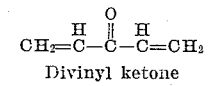
Divinyl ketone

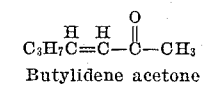
Butylidene acetone

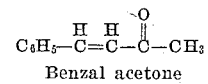
Benzal acetone

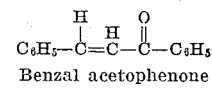
Benzal acetophenone

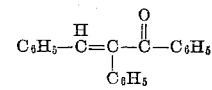
Benzal phenylacetophenone

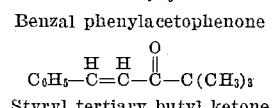
Styryl tertiary butyl ketone

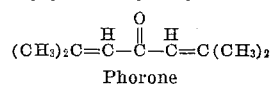
Phorone

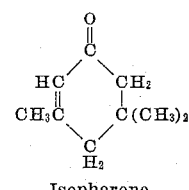
Isophorone

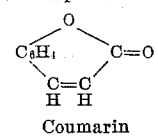
Coumarin

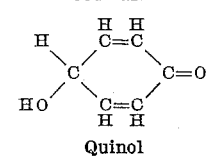
Quinol

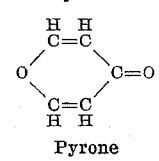
Pyrone

Isophorone has been selected as an example of the above described class of compounds for forming our novel additives. It reacts readily with sulfhydryl compounds according to our invention. With the higher molecular weight commercially available mercaptans, which comprise mercaptans in the range of about $C_{12}$ to about $C_{16}$, it forms compounds having physical properties especially effective for incorporation in lubricating compositions. Isophorone is produced commercially by condensing acetone at elevated temperatures and pressures in the presence of caustic. Both higher and lower boiling products are produced in this process in addition to pure isophorone, and various cuts may be taken of the crude product for use in forming our compounds. Thus instead of or in addition to the pure isophorone, the higher boiling condensation products comprising unsaturated cyclic ketones containing 12 or more carbon atoms in the molecule, known as isophorone bottoms, may be used.

The sulfhydryl compounds employed in the reaction may be aliphatic mercaptans including straight and branched chain and alicyclic mercaptans, preferably those containing from one to about twenty carbon atoms, or aromatic thiol compounds such as thiophenol and thiocresol.

As stated in the literature, the reaction which takes place between a conjugated unsaturated aliphatic ketone and a sulfhydryl compound is principally an addition of a hydrogen atom and of an organic sulfide radical to the olefinic carbon atoms of the unsaturated ketone. For example, the following equation illustrating the reaction is given by Gilman, Organic Chemistry, V. 1, p. 850:

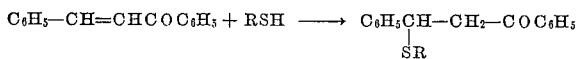

wherein R is an aliphatic or aromatic group.

While it is believed that mixed thio ethers are principally produced by the reaction according to the above equation, it is not intended to limit our invention to this particular type of reaction product, since it appears that a certain amount of reaction involving the carbonyl group of the ketone also occurs, forming mercaptols.

The products obtained by reacting alpha-beta olefin ketones and sulfhydryl compounds have been found to possess excellent anticorrosiveness and other valuable characteristics as lubricant additives. Their effectiveness in this respect is unexpectedly greater than that of other similar sulfur-containing organic compounds. In addition, they are free from undesirable characteristics such as a tendency to decompose with the formation of corrosive compounds, or the objectionable odor and color possessed by many of the sulfur compounds heretofore employed in lubricant compositions.

The amount of these compounds which may be added to lubricating oils will vary widely depending chiefly upon the desired effect. In general, small proportions, for example from about 0.1% to about 10%, and preferably from about 0.5% to about 2%, are employed. However, they may also be employed in concentrations as low as 0.01% or up to any desired concentration within their solubility limits.

The reaction between a conjugated unsaturated ketone and a sulfhydryl compound to produce an additive of our invention may be carried out at ordinary or increased temperatures and pressures, preferably in the presence of a catalyst such as hydrogen chloride or zinc chloride. It may be conveniently carried out by saturating a mixture of ketone and sulfhydryl compound with hydrogen chloride and letting the mixture stand at room temperature and pressure for several days until substantially no further reaction takes place. A multiple pass operation is preferably employed when operating at ordinary temperatures and pressures in order to obtain satisfactory product yields. As an example of this method, an additive (additive A) was prepared from isophorone and tertiary dodecyl mercaptan in a multiple pass operation.

The initial charge, comprising isophorone and a commercial tritiary dodecyl mercaptan in a one to three mol ratio, was saturated with anhydrous hydrogen chloride and permitted to stand for several days. The reaction product was recovered by washing the reaction mixture with a salt solution until it was neutral to litmus, drying it over calcium chloride and finally distilling under reduced pressure. The additive was obtained as the distillation residue boiling above about 160° C. under 1 mm. of mercury. The distillate was reused in three further reaction stages by resaturating it with hydrogen chloride gas, both with and without the addition of further quantities of isophorone, and permitting it to stand at room temperature and pressure as before. From a total of 1066 g. of isophorone and 5877 g. of tertiary dodecyl mercaptan, 420 g. of reaction product was obtained as a composite of the product from the four reaction stages. This product analyzed 14.1% sulfur.

Another additive (additive B) was prepared from isophorone and a commercial tertiary hexadecyl mercaptan by the same method employed in the preparation of additive A. This additive was obtained as the composite product from five runs, reusing the distillates as in the above method. From a total of 338 g. of isophorone and 517 g. of tertiary hexadecyl mercaptan, 228 g. of product was obtained which analyzed 12.08% sulfur.

As an example of the pressure method of carrying out the reaction between a conjugated unsaturated ketone and a sulfhydryl compound, isophorone was reacted with a tertiary dodecyl mercaptan in a single pass operation at 220° F. and 255 pounds per square inch for 8 hours, employing hydrogen chloride as the catalyst as before. From 83 g. of isophorone and 255 g. of mercaptan, 100 g. of reaction product, or a 54% yield, was obtained. The product analyzed 18.0% sulfur.

It is to be understood that the above examples are given by way of illustration only and that our invention is not intended to be limited to the specific compounds prepared or to any particular method of preparing the reaction products of our invention. Since the reaction is known to take place between alpha-beta olefin ketones and sulfhydryl compounds generally, it is obvious that many other ketones of this type and other mercaptans or aromatic sulfides may be employed to produce sulfur-containing compounds of the same type as the compounds prepared as described above. In carrying out the reaction according to the above procedure it is to be noted that modifications may be desirable depending upon the reactants employed. For example, when a ketone containing more than one reactive olefin group is employed, it will usually be desirable to increase the proportion of sulfhydryl reactant correspondingly.

To demonstrate the effectiveness of our additives in lubricant compositions, comparative tests were carried out with lubricating oils containing representative additives of our invention and with the same oils without these additives.

CORROSION TEST

A paraffinic lubricating oil of S. A. E. 30 grade, and blends produced by adding small amounts of additives A and B described above to this oil, were submitted to the MacCouli bearing corrosion test, which is an empirical test designed to show the corrosiveness and oxidation stability of a lubricating oil under the bearing lubrication conditions existing in an internal combustion engine. In this test a copper-lead bearing specimen is rotated at high speed in a sample of the test oil maintained at 350° F. in the presence of catalytic metal surfaces and of air, and the loss in weight of the bearing specimen determined at two-hour intervals up to ten hours. This test is fully described in SAE Transactions, v. 50, pp. 338–345 (August 1942). The following table gives the results obtained.

Table 1
MacCOULL BEARING CORROSION TEST

|  | Cumulative Bearing Weight Loss, mg. | | | | | Neutralization Number of Oil | |
|---|---|---|---|---|---|---|---|
|  | 2 Hrs. | 4 Hrs. | 6 Hrs. | 8 Hrs. | 10 Hrs. | Initial | Final |
| Base oil | 16; 9 | 51; 39 | 78; 64 | 104; 84 | 126; 103 | 0.06; 0.06 | 14.2; 14.8 |
| Base oil+1.0% Additive A | 0; 0 | 0; 0 | 0; 0 | 1; 1 | 2; 1 | 0.09; 0.10 | 2.4; 2.4 |
| Base oil+1.0% Additive B | 0; 0 | 0; 0 | 0; 0 | 0; 0 | 0; 0 | 0.14; 0.11 | 2.8; 2.8 |

The above test was also carried out with the addition of lead peroxide to the test oil, in order to simulate the conditions prevailing in the crank-case of an engine when gasoline containing high concentrations of tetraethyl lead is used. According to this modification of the test, one gram of powdered lead peroxide (PbO₂) is thoroughly mixed into a 125 cc. sample of the test oil before the beginning of the test and an additional gram of lead peroxide is added at each two-hour interval during the test.

The following table shows results obtained in this test, employing the same base oil and additive blends prepared as in the regular MacCoull bearing corrosion test.

Table 2
MODIFIED MacCOULL BEARING CORROSION TEST

|  | Cumulative Bearing Weight Loss, mg. | | | | | Neutralization Number of Oil | |
|---|---|---|---|---|---|---|---|
|  | 2 Hrs. | 4 Hrs. | 6 Hrs. | 8 Hrs. | 10 Hrs. | Initial | Final |
| Base Oil | 15; 29 | 55; 81; | 92; 124 | 120; 154 | 147; 180 | 0.06; 0.06 | 10.9; 10.9 |
| Base oil+1.0% Additive A | 0; 1 | 5; 12 | 20; 29 | 31; 46 | 37; 57 | 0.09; 0.10 | 8.4; 8.0 |
| Base oil+1.0% Additive B | 0; 0 | 0; 0 | 1; 0 | 1; 0 | 1; 0 | 0.14; 0.11 | 0.52; 0.51 |

The above tables show that our additives are extremely effective in preventing corrosion of metal under the lubricating conditions encountered in internal combustion engines. In order to compare their effectiveness in this respect with the mercaptans from which they are made, comparative tests were also carried out with an oil blend containing an alkyl mercaptan and with the same base oil containing the reaction product of the mercaptan with isophorone. The alkyl mercaptan employed was a commercial mercaptan having a specific gravity 0.879/79° F., a molecular weight corresponding to an average of 12–13 carbon atoms to the molecule and a sulfur content of 13.5%. This mercaptan was reacted with isophorone in a single pass operation at room temperature and pressure employing hydrogen chloride gas as the catalyst, according to the method employed in preparing additives A and B. The reaction product analyzed 14.32% sulfur.

Table 3 below shows the results obtained with 1.0% blends of the above described mercaptan and of its isophorone reaction product in an S. A. E. 30 grade paraffinic oil in the MacCoull corrosion test described above.

Table 3
MacCOULL BEARING CORROSION TEST

|  | Cumulative Bearing Weight Loss, mg. | | | | |
|---|---|---|---|---|---|
|  | 2 hrs. | 4 hrs. | 6 hrs. | 8 hrs. | 10 hrs. |
| Base oil | 0; 2 | 32; 29 | 62; 58 | 90; 83 | 100; 108 |
| Base oil+1.0% alkyl mercaptan | 6; 4 | 8; 5 | 13; 6 | 15; 6 | 17; 9 |
| Base oil+1.0% alkyl mercaptan-isophorone reaction product | 3; 3 | 4; 4 | 5; 5 | 5; 5 | 6; 5 |

DEPOSIT TESTS

The effect of our additives on the varnish-forming characteristics of a lubricating oil was determined by means of two tests designed to indicate the varnish forming characteristics of lubricating oils in service. In the first of these tests a weighed glass cylinder is immersed in a sample of the test oil maintained at 350° F. and agitated by a centrifugal mixer. Copper baffles are also immersed in the test oil to act as oxidation catalysts. After 13 hours the test is terminated and the glass cylinder removed, washed with gasoline, dried and reweighed. The amount of varnish deposited on the cylinder is the difference between the initial and final weights of the cylinder. In the second of these tests an aluminum cylinder one inch in diameter and three inches long, maintained at 525° F., is repeatedly dipped into a beaker containing a sample of the test oil for a period of 20 hours. The deposit remaining on the test specimen after washing with pentane and drying is determined.

Table 4 below summarizes the results obtained in these tests, employing S. A. E. 20–30 grade base oils of the same type as was used in the corrosion tests described above.

Table 4
VARNISH DEPOSIT TESTS

|  | Varnish, 350° F., mg. | Varnish, 525° F., mg. |
|---|---|---|
| Base oil | 27.2 | 304 |
| Base oil+1.0% Additive A | 16.3; 11.4 | 39; 102 |
| Base oil | 32.9 | 304 |
| Base oil+1.0% Additive B | 27.6; 22.9 | 44; 105 |

The above table shows the considerable reduction in engine deposits which may be expected by the use of our type additives, particularly at higher temperatures.

OPERATION TESTS

In addition to the above, tests were made to determine the corrosivity of blended oils containing our additives under actual operating conditions. The oils were tested according to the standard Chevrolet CRC L–4 test, employing a standard Chevrolet 6-cylinder engine operated under a load of about 30 horsepower with a coolant temperature of about 200° F. and an oil temperature of about 280° F. The loss in weight of the copper-lead bearings was determined after 16 hours. A paraffinic S. A. E. 30-grade oil and a blend of this oil containing 1.0% of additive A were submitted to this test. The results are shown in the following table:

Table 5

| Oil Composition | CRC Rating | | Bearing Weight Loss, mg., 36 Hours | Neutralization Number, Used Oil, 16 Hours |
| --- | --- | --- | --- | --- |
| | Piston Skirt | Total | | |
| Base oil | 8.8 | 81.8 | 6.174 | 4.0 |
| Base oil+1.0% Additive A | 6.8 | 78.8 | 0.325 | 2.5 |

The CRC rating is a numerical value denoting the amount of clean surface on the piston skirt and rings as determined by visual inspection and calculated on the basis of 100 for an entirely clean piston.

Although a Mid-Continent paraffinic base lubricating oil was used in the tests described, the use of our additives is not limited to this particular base stock, since our compounds may be employed in mineral lubricating oil bases of a wide variety obtained from various types of crudes or synthetic oils by any of the conventional refining methods. Other compounding ingredients may also be present in the lubricating composition such as pour point depressors, oiliness agents, corrosion inhibitors, antioxidants, extreme pressure agents, viscosity index improving agents and thickening agents such as soaps either in minor amounts or in grease-forming proportions.

Obviously, many modifications and variations of the invention, as hereinbefore set forth, may be made without departing from the spirit and scope thereof, and, therefore, only such limitations should be imposed as are indicated in the appended claims.

We claim:

1. A lubricant composition comprising a major amount of a mineral lubricating oil and a minor amount sufficient to improve the anticorrosive characteristics thereof of a compound obtained by reacting isophorone and a tertiary aliphatic $C_{12}$—$C_{16}$ mercaptan in a mol ratio of not more than about 1 to 3.

2. A lubricant composition comprising a major amount of a mineral lubricating oil with from about 0.1% to about 10% of a compound obtained by reacting isophorone and tertiary hexadecyl mercaptan in a mol ratio of not more than about 1 to 3.

3. A lubricant composition comprising a major amount of a mineral lubricating oil with from about 0.1% to about 10% of a compound obtained by reacting isophorone and tertiary dodecyl mercaptan in a mol ratio of not more than about 1 to 3.

4. A lubricant composition comprising a major amount of a mineral lubricating oil and a minor amount sufficient to improve the anticorrosion characteristics thereof of a compound obtained by reacting isophorone and a $C_{12}$—$C_{20}$ aliphatic mercaptan in a mol ratio of not more than about 1 to 3.

5. Claim 4 wherein the mercaptan is a tertiary aliphatic mercaptan.

6. A lubricant composition comprising a major amount of a mineral lubricating oil and a minor amount sufficient to improve the anticorrosion characteristics thereof of a compound obtained by reacting an aliphatic alpha-beta unsaturated ketone and an organic sulfhydryl compound in a mol ratio of not more than about 1 to 3.

7. Claim 6 wherein the said sulfhydryl compound is a mercaptan.

8. Claim 6 wherein the said ketone is a cyclic aliphatic alpha-beta unsaturated ketone.

9. A lubricant composition comprising a major amount of a mineral lubricating oil and a minor amount sufficient to improve the anticorrosion characteristics thereof of a compound obtained by reacting an aliphatic alpha-beta unsaturated ketone and a $C_1$—$C_{20}$ aliphatic mercaptan in a mol ratio of not more than about 1 to 3.

10. Claim 9 wherein the said mercaptan is a $C_4$—$C_{20}$ mercaptan.

11. Claim 9 wherein the said ketone is a cyclic aliphatic alpha-beta unsaturated ketone.

12. Claim 9 wherein the said ketone is isophorone.

13. Claim 9 wherein the reaction is carried out in the presence of a catalyst.

14. Claim 9 wherein the reaction is carried out in the presence of a catalyst, at ordinary temperatures and at substantially atmospheric pressure.

15. A lubricant composition comprising a major amount of a mineral lubricating oil and a minor amount sufficient to improve the anticorrosion characteristics thereof of a compound obtained by reacting a cyclic aliphatic alpha-beta unsaturated ketone and a $C_1$—$C_{20}$ aliphatic mercaptan in a mol ratio of not more than about 1 to 3 in the presence of a catalyst.

16. Claim 15 wherein the said mercaptan is a $C_4$—$C_{20}$ mercaptan.

17. Claim 15 wherein the said ketone is isophorone.

18. A lubricant composition comprising a major amount of a mineral lubricating oil and a minor amount sufficient to improve the anticorrosion characteristics thereof of a compound obtained by reacting isophorone and a $C_{12}$—$C_{20}$ aliphatic mercaptan in a mol ratio of not more than about 1 to 3 in the presence of a catalyst.

19. Claim 18 wherein the reaction is carried out at ordinary temperatures and at substantially atmospheric pressure.

References Cited in the file of this patent

UNITED STATES PATENTS

| 2,492,334 | Thompson | Dec. 27, 1949 |
| 2,522,670 | Frank | Sept. 19, 1950 |
| 2,543,325 | Mattson | Feb. 27, 1951 |